Aug. 26, 1969  S. KAUFMAN ET AL  3,462,971

FLEXIBLE GEAR COUPLING

Filed April 1, 1968

INVENTORS
SAMUEL KAUFMAN
HERBERT A. CONRAD

BY

*Howard C. Miskin*

ATTORNEY

United States Patent Office 3,462,971
Patented Aug. 26, 1969

3,462,971
FLEXIBLE GEAR COUPLING
Samuel Kaufman, Tappan, N.Y., and Herbert A. Conrad, Old Tappan, N.J., assignors to Sier-Bath Gear Co., Inc., North Bergen, N.J., a corporation of New Jersey
Filed Apr. 1, 1968, Ser. No. 717,574
Int. Cl. F16d 3/18
U.S. Cl. 64—9                    7 Claims

ABSTRACT OF THE DISCLOSURE

This invention relates to flexible shaft couplings, particularly of the self-aligning gear type, which can be used in enclosed or generally inaccessible places.

---

Flexible couplings are intended to connect a drive and a driven shaft, and absorb probable misalignment of the shafts, both angular and offset. While it is normally intended to align a pair of shafts as accurately as possible, this is oftentimes difficult or impossible for many reasons. Besides misalignment of a pair of shafts, a flexible gear coupling is intended to overcome any end float of the shafts occurring during rotation of a shaft, even though slight.

During operation it is oftentimes necessary to be able to remove a coupling and seal even though it is difficult or impossible to obtain access to the coupling, because it is within a closed structure, such as a pipe or bell housing, or otherwise inaccessible.

The primary object of this invention is to provide a coupling which can be rotated at high speeds over long periods, and be assembled in blind areas either horizontally or vertically, such as within a pipe of the type used for drilling rigs, or within a bell housing.

A further object of the present invention is to provide a coupling with hubs having an integral raised seal support which act to positively position the sleeve of the coupling, and which retains the lubricant within the coupling, as well as restricting the entry of the foreign matter, which allows trouble-free performance over long periods of time.

A further object of the invention is to provide a symmetrical, high-speed coupling that does not rejuire multi-unit seal-retaining elements and has a minimum of dynamic unbalance and yet can be assembled in a vertical or horizontal position by being guided from a position remote from the coupling.

A still further object of the present invention is to provide a flexible gear coupling in which the sealing elements will retain the lubrication and cannot be removed by failure of other parts of the coupling, such as due from thrust, nor be harmed or destroyed by unintentional contact with the sleeve gearing.

Another object of the present invention is to provide a flexible gear coupling that has larger bore capacities within the same space limitations of prior art couplings of equivalent size, and which will not require additional lubricants after assembly.

Another object of the present invention is to provide a coupling which is strong, simple in construction, economical to manufacture, durable in use, easy to assemble, non-leaking, and which is compact in form.

Figure 1:
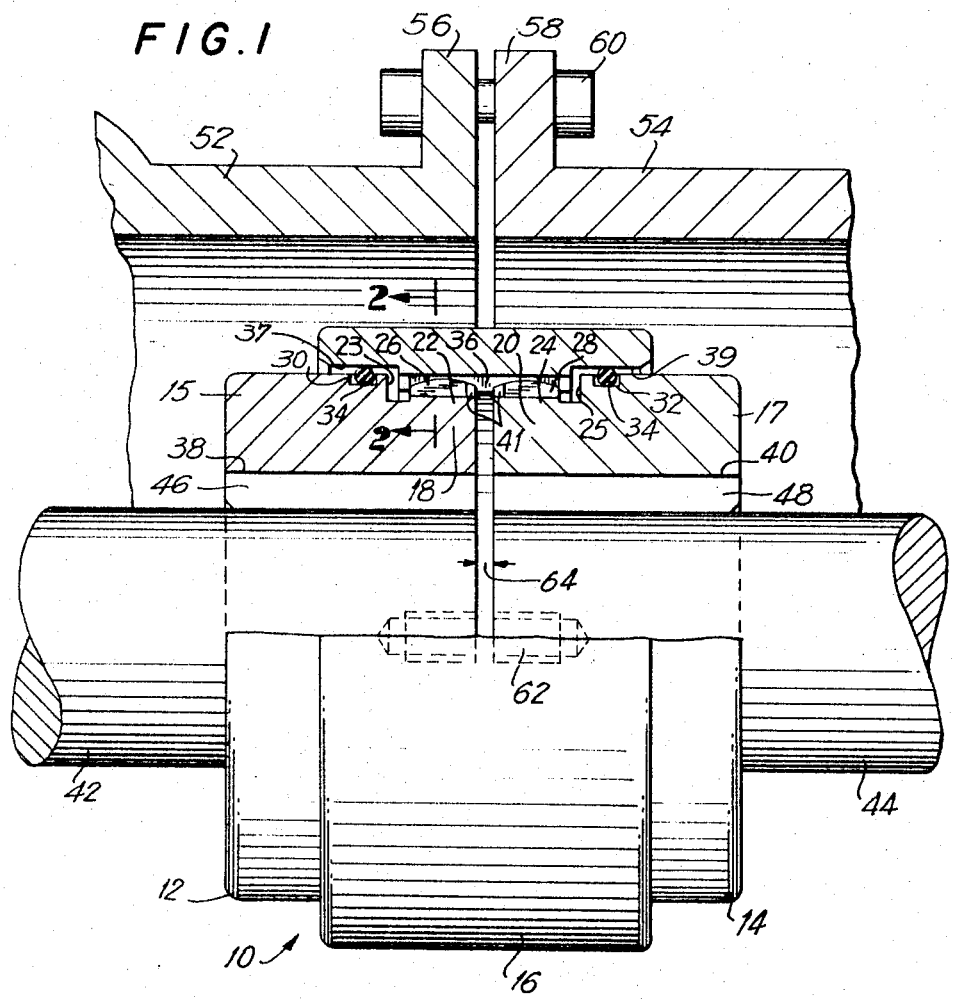
Figure 2:
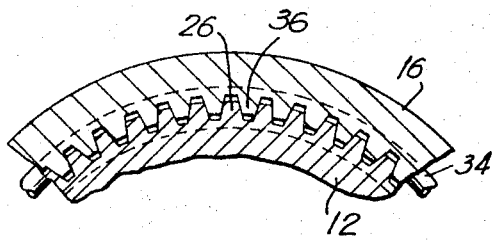

Other objects and advantages of this invention will be apparent during the course of the following detailed description taken in connection with the accompanying drawing, in which:

FIGURE 1 shows a coupling partially in cross-section, having an outer housing about the coupling, shown broken away; and FIGURE 2 is a cross-sectional view taken along line 2—2 of FIGURE 1.

Referring to the drawings, in general a flexible shaft coupling 10 in accordance with the present invention comprises the following main elements: complementary shaft hub member 12 and 14 and a unitary sleeve member 16. Shaft hub members 12 and 14 each have a cylindrical collar 15 and 17, respectively, and a reduced diameter portion 18 and 20, respectively. Reduced portions 18 and 20 have radial flanges 22 and 24, respectively, thereabout adjacent the end containing peripheral gear teeth 26 and 28, respectively. Separating collar 15 from reduced portion 18 on hub 12 is a shoulder 23 and separating collar 17 from reduced portion 20 on hub 14 is a shoulder 25. Advantageously, shoulders 23 and 25 are spaced from corresponding flanges 22 and 24 to provide a clearance during operation. Circumferentially disposed about the outer peripheral surface of collars 15 and 17 are annular grooves 30 and 32, respectively, in which are mounted a ring or seal 34.

Sleeve member 16 has an inner bore containing internal gear teeth 36 extending longitudinally a distance sufficient for engagement with gear teeth 26 and 28 on hubs 12 and 14, respectively, when in operating position. Further, the leading edges of sleeve teeth 36 and hub teeth 26 and 28 are preferably chamfered as at 39 to aid in assembling the coupling. Each of the opposite ends of sleeve 16 are counterbored to receive corresponding collars 15 and 17 of hubs 12 and 14, respectively, in sealing relation with seal ring 34. Seal ring 34 makes sealing engagement with the internal circumferential surfaces of counterbores 37 and 39 in sleeve 16 and seals the lubricant within sleeve 16 and collars 15 and 17.

Advantageously, the center bores of hubs 12 and 14 have keyways 38 and 40, which cooperate with keyways in corresponding shafts 42 and 44, respectively. Interfitted within keyway 38 and the keyway in corresponding shaft 42 is a key 46 which securely retains hub 12 on shaft 42. Similarly interfitted within keyway 40 and its corresponding keyway within shaft 44 is a key 48, which retains hub 14 on shaft 44.

Surrounding coupling 10 is a bell housing formed of portions 52 and 54, respectively, each terminating in a radial flange 56 and 58, respectively. Housing 52 could be a motor housing and fixed in position. Flanges 56 and 58 are clamped together by means of bolts 60 in a conventional manner.

To assemble coupling 10, seals 34, such as O-rings, are positioned in their respective sealing grooves 30 and 32 on hubs 12 and 14, respectively. Hubs 12 and 14 are mounted on their respective shafts 42 and 44 with puller holes 62 facing the shaft ends. One of the shafts is fixed in position. Sleeve 16 is placed over the hub installed on one of the shafts and the gear teeth are matingly intermeshed. The other shaft is moved longitudinally towards the fixed shaft until both hubs are received within the corresponding counterbores of sleeve 16 and the hub shoulders, i.e., 23 and 25 abut their corresponding sleeve shoulders formed by the sleeve counterbores or the ends of sleeve teeth 36. The shaft may be backed off slightly to leave a small space of clearance between the hub shoulders and the corresponding sleeve shoulder of the counterbores. The other shaft is fixed in position and the desired spacing is obtained between shafts 42 and 44, respectively. Teeth 26 and 28 of hubs 12 and 14 and/or sleeve teeth 36 are packed with the desired grease or lubricant prior to assembling, so no grease hole and plug is needed.

When it is necessary to inspect the coupling or replace a defective part, the removable part 54 of the housing is removed, thereby allowing inspection of the coupling and replacement of any defective parts. This is accomplished merely by loosening bolts 60 and removing housing 54. Shaft 44 is withdrawn, and either or both of hubs 12 or 14 can be slipped out of sleeve 16 and the necessary inspection and replacement of parts can be made. The coupling is easily reassembled as described above. When necessary, sealing element 34 can be replaced without the necessity of removing the hub from its respective shaft.

From the foregoing the compactness, simplicity and durability of the coupling is readily apparent. The lack of any vibrational movement of additional bolts, lock rings, lubrication openings and plugs, or the like heretofore required, avoids a source of excessive vibration or resonance during rotation, which is detrimental to the effiency and operation of the couplings. Further, since the sealing elements are located within an annular groove, they cannot come in contact with the sleeve gearing and are therefore protected from being gouged, crushed or destroyed, as oftentimes occurred in the prior art constructions. Since the seal ring 34 is securely mounted in an integral collar, lock rings, washers, spacers, retaining rings, screws and bolts, heretofore required to maintain the seals in position and the coupling assembled, are eliminated, which avoids parts that have resonant speeds below the coupling resonant speed. Additionally, the elimination of these retaining pieces, avoids the danger of such retaining rings, washers, spacers, screws, bolts and the like from becoming loose during use and damaging the equipment or coupling or causing the coupling to become loose or to become disassembled. Also, since the construction allows almost no leakage of lubrication, lubrication holes and plugs are eliminated, which eliminates causes for much dynamic unbalance of the coupling. Also, the coaction of the integral collar and seal allow the coupling to be used in both horizontal or vertical applications without requiring additional elements to retain lubrication, or protect the seals or spacing. By reason of the high retention of the lubricant during use, the coupling can be used in applications where it is difficult or inconvenient to add additional lubricant.

It should be noted that the integral collars on the hubs contain the sealing elements and also act as a positive locator for the sleeve by reason of the shoulders formed by the collars and the corresponding shoulders formed at opposite ends of sleeve 16 by counterbores 37 and 39 and teeth 36. Additionally, by accurately dimensioning the hubs and its corresponding collars, coupling 10 can be assembled so that hubs 12 and 14 mate with sleeve 16 to allow sufficient clearance between shaft ends indicated at 64, so that the shaft ends float to compensate for misalignment of the shafts even though continuing to rotate and transmit power.

Although the sealing characteristics of the improved construction shown in the present application have been primarily described, it is seen that this construction serves also as a buffer reacting against sharp torques or misaligning stresses causing thrust that may be applied to the coupling and still retain good sealing characteristics. Further, while the drawing shows the application used with a motor within a bell housing, it can be used in tubes or other inaccessible positions.

Various changes in the shape and size and arrangement of the parts may be made to the form of the invention which is shown and described without departing from the spirit of the invention or the scope of the following claims.

What is claimed is:

1. A flexible shaft coupling of the gear type comprising a pair of complementary shaft end hub members having gear teeth about adjacent ends of said hubs, each of said hubs having a cylindrical portion of larger diameter than and axially outwardly of said teeth, each of said cylindrical portions of said hubs having an annular groove in its outer periphery, a one-piece generally tubular sleeve having spaced internal gear teeth over and in engagement with the gear teeth of said hubs, each end of said sleeve having a counterbore which receives the larger diameter cylindrical portion of its corresponding hub and overlies the groove therein, and sealing means in each of said grooves sealingly engaging the inner peripheral surface of its corresponding counterbore of said sleeve and said groove.

2. A coupling as recited in claim 1, further including a shoulder on each of said hubs and spaced between said cylindrical portion and said hub gear teeth, said shoulders cooperating with corresponding ends of said sleeve internal gear teeth for maintaining said sleeve in operating position.

3. A coupling as recited in cltim 1, wherein the sealing means is an O-ring.

4. A coupling as recited in claim 1, wherein the edges of said gear teeth of said hubs and sleeve are chamfered.

5. A coupling as recited in claim 1, further including means for mounting a shaft to a respective hub.

6. A coupling as recited in claim 5, further including a housing disposed generally about said sleeve, said housing having at least two parts, one of said parts being releasably attached to said other part, one of said hubs and said sleeve being axially movable from said second mentioned part of said housing, so that said coupling may be separated as desired.

7. A flexible shaft coupling of the gear type comprising a shaft end hub member having gear teeth about the end of said hub, said hub having a cylindrical portion of larger diameter than and axially outwardly of said teeth, said cylindrical portion having an annular groove in its outer periphery, a one-piece generally tubular sleeve having spaced internal gear teeth over and in engagement with the gear teeth of said hub at least one end of said sleeve having a counterbore which receives the larger diameter cylindrical portion of the hub and overlies the groove therein, and sealing means in said groove sealingly engaging the inner peripheral surface of its corresponding counterbore of said sleeve and said groove.

References Cited
UNITED STATES PATENTS

| | | | |
|---|---|---|---|
| 2,338,758 | 1/1944 | Fast | 64—9 |
| 3,243,973 | 4/1966 | Kraeling | 64—9 |
| 3,261,182 | 7/1966 | Allen et al | 64—9 |

HALL C. COE, Primary Examiner